US010255441B2

(12) United States Patent
Jung et al.

(10) Patent No.: US 10,255,441 B2
(45) Date of Patent: Apr. 9, 2019

(54) ELECTRONIC DEVICE AND METHOD OF MANAGING IMAGE BY ELECTRONIC DEVICE

(71) Applicant: Samsung Electronics Co., Ltd, Gyeonggi-do (KR)

(72) Inventors: Chan-Ho Jung, Seoul (KR); Han-Gil Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 15/258,992

(22) Filed: Sep. 7, 2016

(65) Prior Publication Data

US 2017/0068821 A1  Mar. 9, 2017

(30) Foreign Application Priority Data

Sep. 7, 2015 (KR) .................. 10-2015-0126320

(51) Int. Cl.
  *G06F 21/60* (2013.01)
  *H04L 29/06* (2006.01)
(52) U.S. Cl.
  CPC ........ *G06F 21/602* (2013.01); *H04L 63/0428* (2013.01)
(58) Field of Classification Search
  CPC ........................ G06F 21/602; H04L 63/0428

USPC ......................................................... 713/150
See application file for complete search history.

(56) References Cited

U.S. PATENT DOCUMENTS

| 8,605,325 B2* | 12/2013 | Miyazaki | G06F 3/04817 345/619 |
| 2008/0136935 A1* | 6/2008 | Kudo | H04N 5/77 348/231.1 |
| 2009/0103619 A1* | 4/2009 | Sohn | H04N 19/597 375/240.16 |
| 2014/0013139 A1* | 1/2014 | Kimura | G06F 1/3209 713/323 |
| 2016/0198168 A1* | 7/2016 | Rossato | H04N 19/30 382/236 |

FOREIGN PATENT DOCUMENTS

| KR | 10-0906067 B1 | 7/2009 |
| KR | 10-0951945 B1 | 4/2010 |

* cited by examiner

*Primary Examiner* — Dant B Shaifer Harriman

(57) ABSTRACT

A method of managing an image by an electronic device may include: generating a first encryption image by encrypting a first image; acquiring bitstream data corresponding to a second image related to the first image; generating a changed image by combining at least some of the bitstream data and the first encryption image; and transmitting the changed image to an external electronic device.

16 Claims, 15 Drawing Sheets

ELECTRONIC DEVICE AND METHOD OF MANAGING IMAGE BY ELECTRONIC DEVICE

CROSS-REFERENCE TO RELATED APPLICATION(S) AND CLAIM OF PRIORITY

The present application is related to and claims priority under 35 U.S.C. § 119(a) to Korean Patent Application Serial No. 10-2015-0126320, which was filed in the Korean Intellectual Property Office on Sep. 7, 2015, the entire contents of which are hereby incorporated by reference.

TECHNICAL FIELD

The present disclosure relates to an electronic device and a method of managing an image by an electronic device.

BACKGROUND

A plurality of cloud service providers provide storage services for a function of storing or reconstructing large capacity data and, for example, provide a function of manually or automatically (sync) uploading personal contents (for example, images, documents, applications, and the like) of a terminal to a cloud server through a link with the user terminal.

In general, the personal contents uploaded to the cloud server may be stored in the terminal and the cloud server in a raw data type to which a separate encryption scheme has not been applied, such that personal information may be leaked from the personal contents through cloud service hacking or by a cloud service provider. For example, a personal image file, which is stored in the cloud server, may be exposed to the outside through cloud service hacking, which causes a problem.

The conventional art is directed to a method of encrypting an original image in a client terminal and then uploading the encrypted original image to the cloud server in order to protect contents to be stored in the cloud server. When the encrypted original image is uploaded to the cloud server, the cloud server may generate a thumbnail image based on the uploaded encrypted original image.

However, when the thumbnail image generated by the cloud server is downloaded to the client terminal, the client terminal may decrypt the downloaded thumbnail image since information on the original image is lost during the generation of the thumbnail image by the cloud server.

Accordingly, in order to display the thumbnail image of the encrypted original image, the client terminal should perform a process of downloading the whole encrypted original image from the cloud server, decrypting the downloaded encrypted original image, and then generating the thumbnail image, but such a process uses unnecessary network packets and requires an overlapping thumbnail image generation process.

SUMMARY

To address the above-discussed deficiencies, an object of the present disclosure is to solve at least the above-mentioned problems and/or disadvantages and to provide at least the advantages described below. Accordingly, various embodiments of the present disclosure may provide an electronic device which may generate a thumbnail image of an encrypted original image stored in a cloud server, and a method of managing an image by an electronic device.

In accordance with an aspect of the present disclosure, a method of managing an image by an electronic device is provided. The method includes: generating a first encryption image by encrypting a first image; acquiring bitstream data corresponding to a second image related to the first image; generating a changed image by combining at least some of the bitstream data and the first encryption image; and transmitting the changed image to an external electronic device.

In accordance with another aspect of the present disclosure, an electronic device is provided. The electronic device includes: a display; and a processor configured to generate a first encryption image by encrypting a first image, to acquire bitstream data corresponding to a second image related to the first image, to generate a changed image by combining at least some of the bitstream data with the first encryption image, and to transmit the changed image to an external electronic device.

An aspect of the present disclosure provides an electronic device and an image management method of the electronic device according to various embodiments which include an effect of generating a thumbnail image of an encrypted original image stored in a cloud server with a minimum or reduced network bandwidth and without or with reduced overlapping image processing procedure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
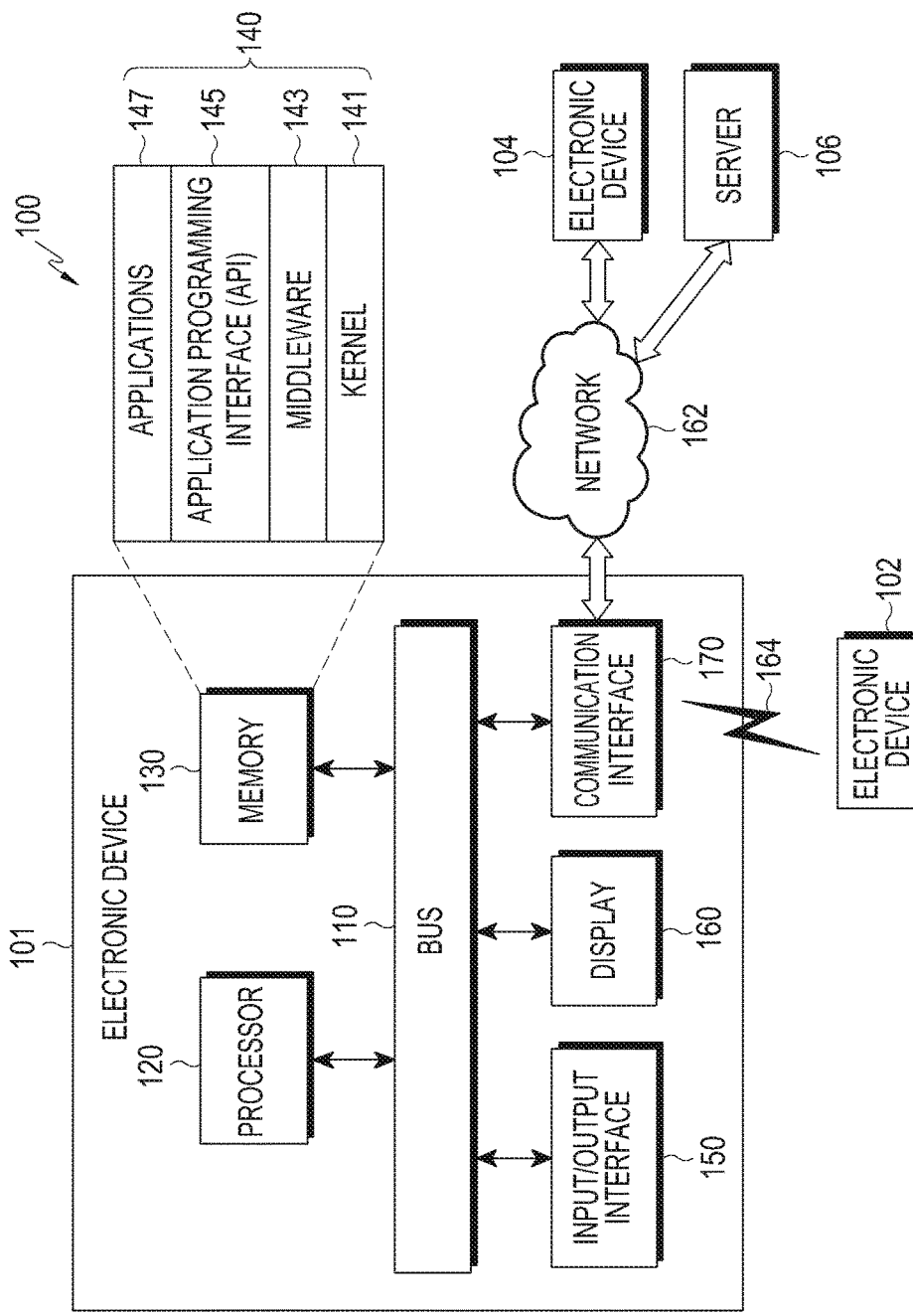
FIG. 1 illustrates a network environment according to various embodiments of the present disclosure.

FIGS. 1 through 11D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments of the present disclosure and are not intended to limit the scope of other embodiments. As used herein, singular forms may include plural forms as well unless the context clearly indicates otherwise. Unless defined otherwise, all terms used herein, including technical and scientific terms, include the same meaning as those commonly understood by a person skilled in the art to which the present disclosure pertains. Such terms as those defined in a generally used dictionary may be interpreted to include the meanings equal to the contextual meanings in the relevant field of art, and are not to be interpreted to include ideal or excessively formal meanings unless clearly defined in the present disclosure. In some examples, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®, an electronic dictionary, an electronic key, a camcorder, and an electronic photo frame.

According to another embodiment of the present disclosure, the electronic device may include at least one of various medical devices (e.g., various portable medical measuring devices such as a blood glucose monitoring device, a heart rate monitoring device, a blood pressure measuring device, a body temperature measuring device, a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), an avionics device, a security device, an automotive head unit, a robot for home or industry, an automatic teller's machine (ATM) in a bank, a point of sales (POS) device in a shop, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, and the like).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments of the present disclosure, the electronic device may be a combination of one or more of the aforementioned various devices. According to some embodiments of the present disclosure, the electronic device may also be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments of the present disclosure, will be described with reference to FIG. 1. The electronic device 101 may include a bus 110, a processor 120, a memory 130, an input/output interface 150, a display 160, and a communication interface 170. In some embodiments of the present disclosure, the electronic device 101 may omit at least one of the above elements or may further include other elements.

The bus 110 may include, for example, a circuit for interconnecting the elements 110 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to control and/or communication of at least one other component of the electronic device 101. The memory 130 may include a volatile memory and/or a non-volatile memory. The memory 130 may store, for example, instructions or data relevant to at least one other element of the electronic device 101. According to an embodiment of the present disclosure, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may serve as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external electronic device to the other element(s) of the electronic device 101. Furthermore, the input/output interface 150 may output the instructions or data received from the other element(s) of the electronic device 101 to the user or another external electronic device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) for the user. The display 160 may include a touch screen, and may receive, for example, a touch, gesture, proximity, or hovering input by using an electronic pen or a part of the user's body.

The communication module 170, for example, may set communication between the electronic device 101 and an external electronic device (for example, a first external electronic device 102, a second external electronic device 104, or a server 106). For example, the communication circuit 170 may be connected to a network 162 through wireless or wired communication to communicate with the external electronic device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), and the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (for example, the electronic devices 102 and 104 or the server 106). According to an embodiment of the present disclosure, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104) or the server 106 may execute the requested functions or the additional functions, and may deliver a result of the execution to the electronic device 101. The electronic device 101 may process the received result as it is or additionally process the result to provide the requested functions or services. To achieve this, for example, cloud computing, distributed computing, or client-server computing technology may be used.

Figure 2:
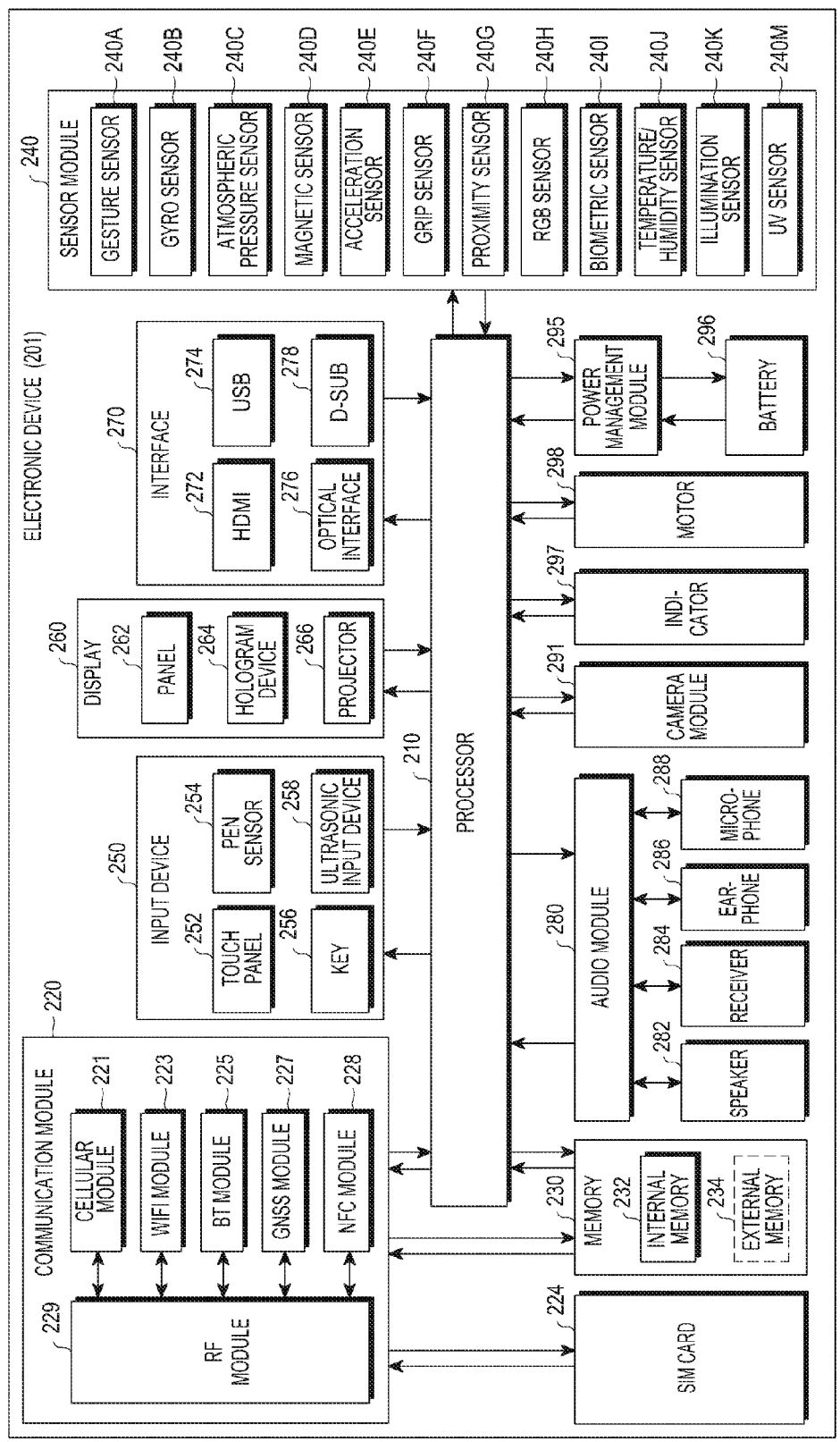
FIG. 2 is a block diagram illustrating an electronic device according to various embodiments of the present disclosure.

FIG. 2 is a block diagram of an electronic device 201 according to various embodiments of the present disclosure. The electronic device 201 may include, for example, the whole or part of the electronic device 101 illustrated in FIG. 1. The electronic device 201 may include at least one processor 210 (for example, an Application Processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving, for example, an operating system or an application program and perform processing of various pieces of data and calculations. The processor 210 may be implemented by, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may be configured to be equal or similar to that of the communication module 170 of FIG. 1. The communication module 220 may include, for example, a cellular module 221, a Wi-Fi module 223, a Bluetooth® module 225, a GNSS® module 227 (for example, a GPS module, a Glonass® module, a Beidou® module, or a Galileo® module), an NFC module 228, and a Radio Frequency (RF) module 229.

The cellular module 221 may provide a voice call, an image call, a text message service, or an Internet service through, for example, a communication network. According to an embodiment of the present disclosure, the cellular module 221 may identify and authenticate the electronic device 201 within a communication network using a subscriber identification module (for example, the SIM card 224). According to an embodiment of the present disclosure, the cellular module 221 may perform at least some of the functions that the processor 210 may provide. According to an embodiment of the present disclosure, the cellular module 221 may include a Communication Processor (CP).

The Wi-Fi module 223, the Bluetooth® module 225, the GNSS® module 227, or the NFC module 228 may include, for example, a processor that processes data transmitted and received through the corresponding module. According to some embodiments of the present disclosure, at least some (for example, two or more) of the cellular module 221, the Wi-Fi module 223, the BT® module 225, the GNSS® module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment of the present disclosure, at least one of the cellular module 221, the Wi-Fi module 223, the BT® module 225, the GNSS® module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment of the present disclosure, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, and the like) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may indicate a state (for example, a booting state, a message state, a charging state, or the like) of the electronic device 201 or a part (for example, the processor 210) of the electronic device 201. The motor 298 may convert an electrical signal into mechanical vibration, and may generate vibration, a haptic effect, or the like. Although not illustrated, the electronic device 201 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or media forward-link-only (mediaFLO®).

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments of the present disclosure may be combined into one entity, which may perform functions identical to those of the relevant components before the combination.

Figure 3:
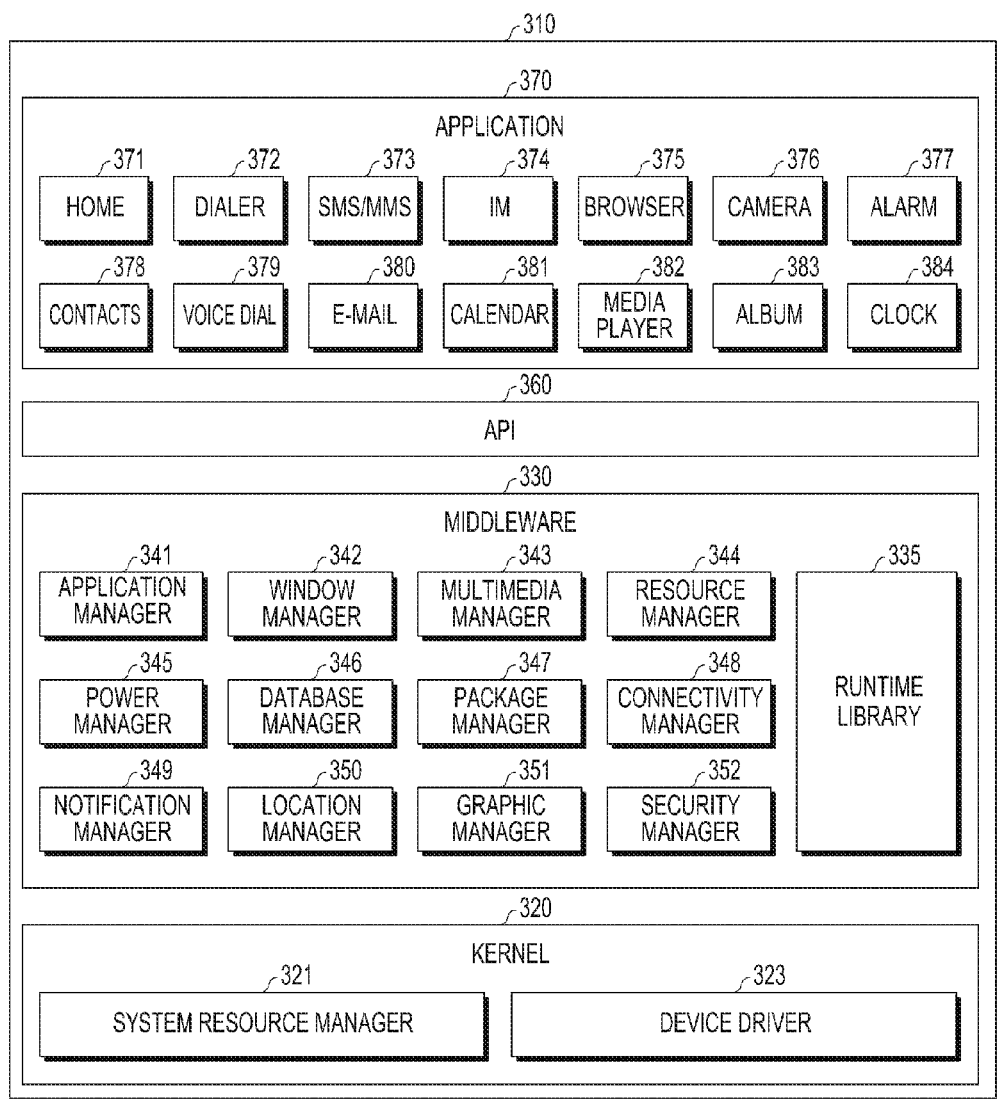
FIG. 3 is a block diagram illustrating a program module according to various embodiments of the present disclosure.

FIG. 3 is a block diagram of a program module according to various embodiments of the present disclosure. According to an embodiment of the present disclosure, the program module 310 (for example, the program 140) may include an Operating System (OS) for controlling resources related to the electronic device (for example, the electronic device 101) and/or various applications (for example, the application programs 147) executed in the operating system. The operating system may be, for example, Android®, iOS®, Windows®, Symbian®, Tizen® Bada®, or the like.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, assign, or collect system resources. According to an embodiment of the present disclosure, the system resource manager 321 may include a process manager, a memory manager, or a file system manager. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

The middleware 330 may provide a function used by the applications 370 in common or provide various functions to the applications 370 through the API 360 such that the applications 370 can efficiently use limited system resources within the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used on a screen. The multimedia manager 343 may identify formats desired for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a Basic Input/Output System (BIOS) to manage a battery or power and may provide power information regarding operation of the electronic device. The database manager 346 may generate, search for, and/or change a database to be used by at least one of the applications 370. The package manager 347 may manage the installation or the updating of an application distributed in the form of a package file.

The connectivity manager 348 may manage a wireless connection such as, for example, Wi-Fi or Bluetooth®. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions regarding system security or user authentication. According to an embodiment of the present disclosure, when the electronic device (for example, the electronic device 101) has a telephone call function, the middleware 330 may further include a telephony manager for managing a voice call function or a video call function of the electronic device.

The middleware 330 may include a middleware module that forms combinations of various functions of the above described elements. The middleware 330 may provide modules specialized according to types of operating systems in order to provide differentiated functions. Furthermore, the middleware 330 may dynamically remove some of the existing elements, or may add new elements.

The API 360 (for example, the API 145) is, for example, a set of API programming functions, and may be provided with a different configuration according to an OS. For example, in an operating system such as Android® or iOS®, one API set may be provided for each platform, and in an operating system such as Tizen®, two or more API sets may be provided for each platform.

The applications 370 (for example, the application programs 147) may include, for example, one or more applications that can perform functions, such as home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (for example, measure exercise quantity or blood sugar), or environment information (for example, atmospheric pressure, humidity, temperature information or the like).

According to an embodiment of the present disclosure, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the present disclosure, the applications 370 may include applications (for example, a health care application of a mobile medical appliance or the like) designated according to attributes of the external electronic device 102 or 104. According to an embodiment of the present disclosure, the applications 370 may include an application received from the external electronic device (for example, the server 106, or the electronic device 102 or 104). According to an embodiment of the present disclosure, the applications 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum or reduced unit of an integrated component element or a part thereof. The "module" may be a minimum or reduced unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments of the present disclosure based on the technical idea of the present disclosure.

Figure 4:
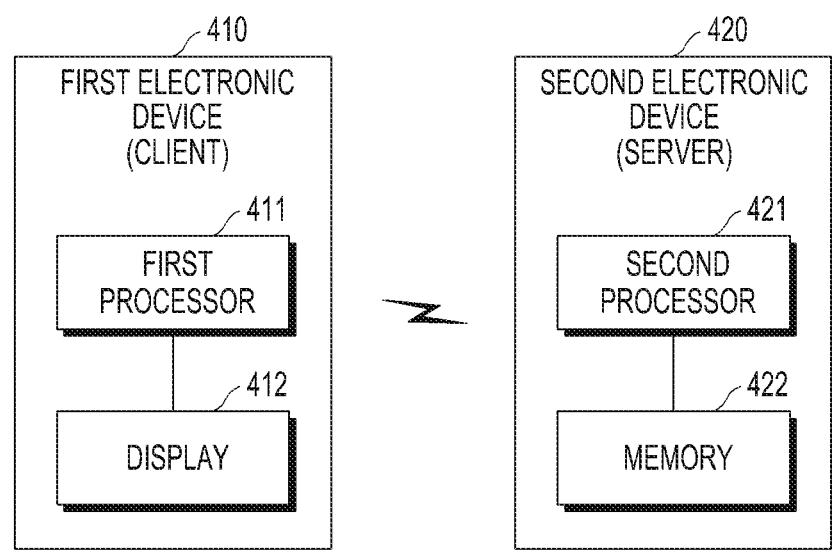
FIG. 4 illustrates an image management system according to various embodiments of the present disclosure.

FIG. 4 illustrates an image management system according to various embodiments of the present disclosure. Referring to FIG. 4, the system may include a first electronic device 410 and at least one second electronic device 420. The first electronic device 410 may be, for example, the electronic device 101 illustrated in FIG. 1, or may be a client terminal in the system. The second electronic device 410 may be, for example, an external electronic device such as the electronic device 104 or the server 106 illustrated in FIG. 1, or may be a cloud server in the system.

According to various embodiments of the present disclosure, the first electronic device 410 may include a first processor 411 and a display 412.

According to various embodiments of the present disclosure, when a first image corresponding to an original image to be transmitted to the second electronic device 420 is selected based on a transmission request, the first processor 411 may generate a changed image related to the first image, which can be transmitted to the second electronic device 420 based on transmission information of the first image.

According to an embodiment of the present disclosure, the transmission request may be made based on a user's request or state information of the first electronic device.

According to an embodiment of the present disclosure, the state information of the first electronic device may include at least one of a network connection state, location information of the first electronic device, or time information. For example, when the network connection state of the first electronic device 410 is a Wi-Fi on state, the first electronic device 410 is located at an area corresponding to a preset transmission request, or a current time is a time corresponding to the preset transmission request, at least one image stored in the first electronic device 410 (for example, an image which has not been transmitted to the second electronic device 420 or an image pre-selected by the user) may be selected as the first image.

According to an embodiment of the present disclosure, the transmission information may be information preset to determine whether the first image is transmitted and may include, for example, at least one of the network connection state, photographing information (location information) of the first image and application information related to the first image.

According to an embodiment of the present disclosure, the transmission information may include first transmission information, and the first transmission information may be non-transmission information of the first image. The first transmission information may include, for example, at least one of the network connection states corresponding to a Wi-Fi off state, the location information corresponding to first location information (for example, home and office) among the photographing information of the first image, and first application information (for example, a messenger application to which the first image is downloaded) among the application information related to the first image.

According to an embodiment of the present disclosure, the first processor 411 may select the first image based on a user's request and, when the selected transmission information of the first image is not included in the first transmission information, may generate the changed image related to the first image.

For example, when the first transmission information (for example, the first location information of the first image or the first application information related to the first image) is not included in the first image selected by the user among the images stored in the first electronic device 410, the first processor 411 may generate the changed image related to the first image.

According to an embodiment of the present disclosure, when the transmission information of the first image selected based on the user's request is included in the first transmission information, the first processor 411 may inform the user that the transmission information of the first image selected by the user includes the first transmission information. When the user makes a request for transmitting the first image including the first transmission information, the first processor 411 may generate the changed image related to the first image including the first transmission information.

According to an embodiment of the present disclosure, the first processor 411 may select the first image based on state information of the first electronic device and may generate the changed image related to the selected first image.

For example, when the network connection state of the first electronic device 410 is a Wi-Fi on state, the first processor 411 may select at least one image (for example, an image which has not been transmitted to the second electronic device 420 or an image pre-selected by the user) from the images stored in the first electronic device 410 and generate the changed image related to the first image.

According to an embodiment of the present disclosure, the first processor 411 may select the first image based on the state information of the first electronic device 410 and, when transmission information of the selected first image is not included in the first transmission information, may generate the changed information related to the first image.

For example, when the network connection state of the first electronic device 410 is the Wi-Fi on state, the first processor 411 may identify the first image, which does not include the first transmission information (for example, first location information of the first image or first application information related to the first image) among the images stored in the first electronic device 410 and generate the changed image related to the first image.

According to an embodiment of the present disclosure, the first processor 411 may select the first image based on the state information of the first electronic device 410 and, when transmission information of the selected first image is included in the first transmission information, may inform the user of the first image including the first transmission information. When transmission of the first image including the transmission information is requested by the user, the first processor 411 may generate the changed image related to the first image including the first transmission information.

According to various embodiments of the present disclosure, when the first image to be transmitted to the second electronic device 420 is selected, the first processor 411 may combine at least some of bitstream data corresponding to a second image related to the first image with a first encryption image, which is generated by encrypting the first image, to generate a changed image and may transmit the changed image to the second electronic device 420. The second image may include a thumbnail image of the first image. The thumbnail image may include at least one of a first thumbnail image related to the first image generated by the electronic device 410 and a second thumbnail image related to the first image to be generated by the second image 420.

The second thumbnail image may indicate a predicted thumbnail image, which can be generated by the second electronic device 420, and the first processor 411 may pre-store size information and color degradation information of the second thumbnail image of each of at least one second electronic device 420. For example, the first processor 411 may transmit a test image to the second electronic device 420, and the second electronic device 420 may receive a thumbnail image generated based on the test image and pre-store size information and color degradation information of the second thumbnail image.

According to an embodiment of the present disclosure, the first processor 411 may generate the changed image based on one of a plurality of image processing schemes based on at least one of a plurality of conditions.

A first condition among the plurality of conditions may be a condition of comparing a difference between a size of the first image (A) and a size of the second thumbnail image (b) with a first threshold value.

A second condition among the plurality of conditions may be a condition of comparing color degradation of the second thumbnail (b) with a second threshold value.

According to an embodiment of the present disclosure, when it is determined that the difference between the size of the first image and the size of the second thumbnail image is smaller than the first threshold based on the first condition and the color degradation of the second thumbnail image is smaller than the second threshold value based on the second condition, the first processor 411 may generate a changed image related to the first image based on a first image processing scheme among the plurality of image processing schemes.

According to the first image processing scheme, the first processor 411 may generate a first encryption image (A') encrypted from the first image (A), generate a first thumbnail image (a) related to the first image (A), and convert the first thumbnail image (a) into bitstream data. The first processor 411 may generate the changed image by combining the first encryption image (A') with the bitstream data corresponding to the first thumbnail image (a) based on a steganography technique. Further, the first processor 411 may encrypt the first thumbnail image (a) related to the first image (a) to generate the first encryption thumbnail image (a') and may convert the first encryption thumbnail image (a') into bitstream data.

For example, when the difference between the size of the first image (A) and the size of the second thumbnail image (b) is equal to or smaller than 25%, the first processor 411 may generate the changed image according to the first image processing scheme and, when the changed image is transmitted to the second electronic device 420, the second electronic device 420 may generate a third image (for example, a thumbnail image) based on the changed image. The third image may include bitstream data which can be extracted based on the steganography technique.

According to an embodiment of the present disclosure, when the difference between the size of the first image and the size of the second thumbnail image is larger than the first threshold value based on the first condition, the first processor 411 may generate a changed image related to the first image based on a second image processing scheme among the plurality of image processing schemes.

According to the second image processing scheme, the first processor 411 may generate the first thumbnail image (a) related to the first image (A) and convert the first thumbnail image (a) into bitstream data. The first processor 411 may generate the second thumbnail image (b) related to the first image (A), generate a second encryption thumbnail image (b') by encrypting the second thumbnail image (b), and combine the second encryption thumbnail image (b') with the bitstream data corresponding to the first thumbnail image (a) based on the steganography technique. The first processor 411 may generate the first encryption image (A') by encrypting the first image (A) and combine the second encryption thumbnail image (b') combined with the bitstream data with the first encryption image (A') based on identifier information. For example, the first processor 411 may combine the second encryption thumbnail image (b') into which the bitstream data is inserted before End of Image with the first encryption image (A') after End of Image based on End of Image of JPEG.

For example, when the difference between the size of the first image (A) and the size of the second thumbnail image (b) is larger than or equal to 25% and when the second electronic device 420 generates the third image based on the changed image generated through the first image processing scheme, bitstream data cannot be extracted from the third image (for example, thumbnail image) based on the steganography technique, such that the second image processing scheme may be used. In the second image processing scheme, the second electronic device 420 may generate the third image (for example, thumbnail image) based on the image located before the identifier information in the changed image, for example, the second encryption thumbnail image (b') into which the bitstream data is inserted, and the third image may include bitstream data, which can be extracted based on the steganography technique.

According to an embodiment of the present disclosure, when the color degradation of the second thumbnail image is larger than the second threshold value based on the second condition, the first processor 411 may generate a changed image related to the first image based on a third image processing scheme among the plurality of image processing schemes.

According to the third image processing scheme, the first processor 411 may generate the first thumbnail image (a) related to the first image (A), generate the first encryption thumbnail image (a') by encrypting the first thumbnail image (a), and combine the first encryption thumbnail image (a') with bitstream data corresponding to information informing of the encryption of the first image based on the steganography technique. The first processor 411 may generate the first encryption image (A') encrypted from the first image (A) and combine the first encryption thumbnail image (a') into which the bitstream data is inserted with the first encryption image (A'). For example, the first processor 411 may combine the first encryption thumbnail image (a') into which the bitstream data is inserted before End of Image based on End of Image of JPEF with the first encryption image (A') after End of Image.

For example, the color degradation of the second thumbnail image, which is larger than the second threshold value based on the third condition, may mean that, when the second electronic device 420 generates the third image (for example, thumbnail image) based on the changed image received from the first electronic device 410, color information of the third image may be seriously changed due to the color degradation. When the color information of the third image is seriously changed due to the color degradation, bitstream data inserted into the third image may be damaged. The third image processing scheme may prevent or reduce bitstream data combined with the third image from being damaged even though the color information has been seriously changed due to the color degradation by combining the first encryption thumbnail image (a') with a small amount of information informing of the encryption of the first image.

According to various embodiments of the present disclosure, the first processor 411 may make a request for receiving the first image to the second electronic device 420 and, when receiving the third image (for example, thumbnail image) generated by the second electronic device 420 from the second electronic device 420 in response to the request for receiving the first image, may generate the second image (for example, thumbnail image) related to the first image based on bitstream data extracted from the third image and display the second image on the display 412.

According to an embodiment of the present disclosure, the first processor 411 may extract the bitstream data combined with the third image received from the second electronic device 420 and, when the extracted bitstream data corresponds to the thumbnail image of the first image, may generate the thumbnail image of the first image by using the extracted bitstream and display the thumbnail image on the display 412. Further, when the third image received from the second electronic device 420 is encrypted, the first processor 411 may extract the bitstream data from the third image, decrypt the extracted bitstream data by using a pre-stored key, generate the thumbnail image of the first image by using the decrypted bitstream, and display the thumbnail image on the display 412.

According to an embodiment of the present disclosure, the first processor 411 may extract the bitstream data combined with the third image received from the second electronic device 420 and, when the extracted bitstream data is information informing of the encryption of the first image, may make a request for the first encryption thumbnail image to the second electronic device 420. The first processor 411 may decrypt the first encryption thumbnail image received from the second electronic device 420, generate the thumbnail image of the first image, and display the thumbnail image on the display 412. According to various embodiments of the present disclosure, the display 412 may be, for example, the display 160 illustrated in FIG. 1. The display 412 may display the second image (for example, thumbnail image) related to the first image stored in the second electronic device 420.

According to various embodiments of the present disclosure, the second electronic device 420 may include a second processor 421 and a memory 422.

According to various embodiments of the present disclosure, when the changed image related to the first image is received from the first electronic device 410, the second processor 421 may generate the third image (for example, thumbnail image) based on the changed image and, when a request for receiving the first image is made by the first electronic device 410, may transmit the third image to the first electronic device 410.

According to an embodiment of the present disclosure, when identifier information (for example, End of Image) is included in the changed image received from the first electronic device 410, the second processor 421 may decrypt an encrypted thumbnail image located before the identifier information to generate the third image (for example, thumbnail image) and transmit the third image to the first electronic device 410.

According to an embodiment of the present disclosure, when the third image generated by the second electronic device 420 is provided to the first electronic device 410 and then a request for a first encryption thumbnail image related to the first image is made by the first electronic device 410, the second processor 421 may transmit, to the first electronic device 410, the first encryption thumbnail image located before the identifier information among the changed image received from the first electronic device 410.

According to various embodiments of the present disclosure, the memory 422 may store the changed image related to the first image received from the first electronic device 421 and a third image (for example, thumbnail image) generated based on the changed image.

According to various embodiments of the present disclosure, the display 412 and the processor 410 may be configured to encrypt the first image to generate the first encryption image, to acquire bitstream data corresponding to a second image related to the first image, to combine at least some of the bitstream data with the first encryption image to generate a changed image, and to transmit the changed image to an external electronic device.

According to various embodiments of the present disclosure, the processor 411 may be configured to identify transmission information of the first image in response to a request for transmitting the first image to the external electronic device and to determine generation of the changed image related to the first image based on the transmission information of the first image, and the transmission information may include at least one of a network connection state, photographing information of the first image, and application information related to the first image.

According to various embodiments of the present disclosure, the second image may include a thumbnail image of the first image.

According to various embodiments of the present disclosure, the thumbnail image may include at least one of a first thumbnail image of the first image generated by the electronic device and a second thumbnail image of the first image to be generated by the external electronic device.

According to various embodiments of the present disclosure, the processor 411 may be configured to generate the changed image by combining at least some of bitstream data corresponding to a first thumbnail image related to the first image with the first encryption image.

According to various embodiments of the present disclosure, the processor 411 may be configured to combine at least some of bitstream data corresponding to a first thumbnail image related to the first image with a second encryption thumbnail image encrypted from a second thumbnail image related to the first image and to combine the second encryption thumbnail image with the first encryption image based on identifier information, so as to generate the changed image.

According to various embodiments of the present disclosure, the processor 411 may be configured to combine at least some of bitstream data corresponding to information informing of encryption of the first image with a first thumbnail image related to the first image with a first encryption thumbnail image and to combine the first encryption thumbnail image with the first encryption image based on identifier information, so as to generate the changed image.

According to various embodiments of the present disclosure, if a third image related to the first image is received from the external electronic device in response to a request for the first image, the processor 411 may be configured to generate the second image related to the first image based on bitstream data acquired from the third image, and the third image includes a thumbnail image generated by the external electronic device based on a changed image corresponding to the first image transmitted from the electronic device.

According to various embodiments of the present disclosure, if the acquired bitstream data corresponds to the second image related to the first image, the processor 411 may be configured to generate the second image based on the bitstream data.

According to various embodiments of the present disclosure, if the acquired bitstream data corresponds to information informing of encryption of the first image, the processor 411 may make a first encryption thumbnail image related to the first image to the external electronic device and to generate the second image based on the first encryption thumbnail image received from the external electronic device.

Figure 5A:
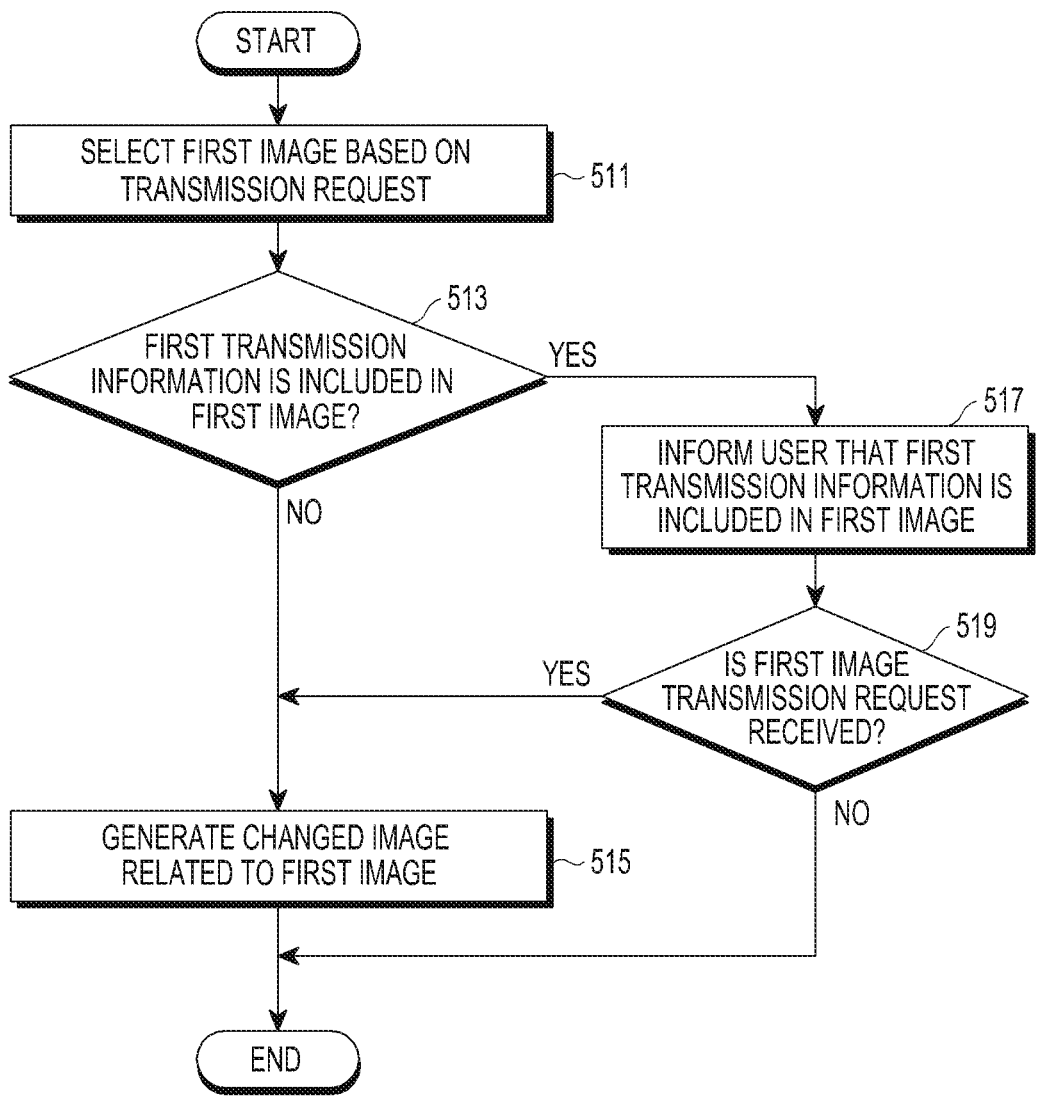
FIG. 5A is a flowchart illustrating an image transmission control method of an electronic device according to various embodiments of the present disclosure.

FIG. 5A is a flowchart illustrating an image transmission control method of an electronic device according to various embodiments of the present disclosure. In FIG. 5A, the image transmission control method of the electronic device according to various embodiments of the present disclosure may be performed by the first processor 411 of the first electronic device 410 of FIG. 4 as an example.

Referring to FIG. 5A, in operation 511, the first processor 411 may select a first image to be uploaded to the second electronic device 420 based on a transmission request. The first image selected based on the transmission request may be selected based on at least one of a user's request, a state information (for example, at least one of a network connection state, and location information and time information of the first electronic device) of a first electronic device, and location information or time information of the first electronic device. In operation 513, the first processor 411 may identify whether the selected first image includes first transmission information. When it is identified that the first transmission information is not included in the first image in operation 513, the first processor 411 may perform an operation of generating a changed image related to the first image in operation 515. The operation of generating the changed image related to the first image will be described in detail with reference to FIGS. 5B to 11.

When it is identified that the first transmission information is included in the first image in operation 513, the processor 411 may inform the user that the first transmission information is included in the first image in operation 517. When a request for transmitting the first image including the first transmission information is received by the user in operation 519, the first processor 411 may generate the changed image related to the first image including the first transmission information in operation 515. When the request for transmitting the first image including the first transmission information is not received by the user in operation 519, the first processor 411 may not generate the changed image related to the first image to be transmitted to the second electronic device 420.

Figure 5B:
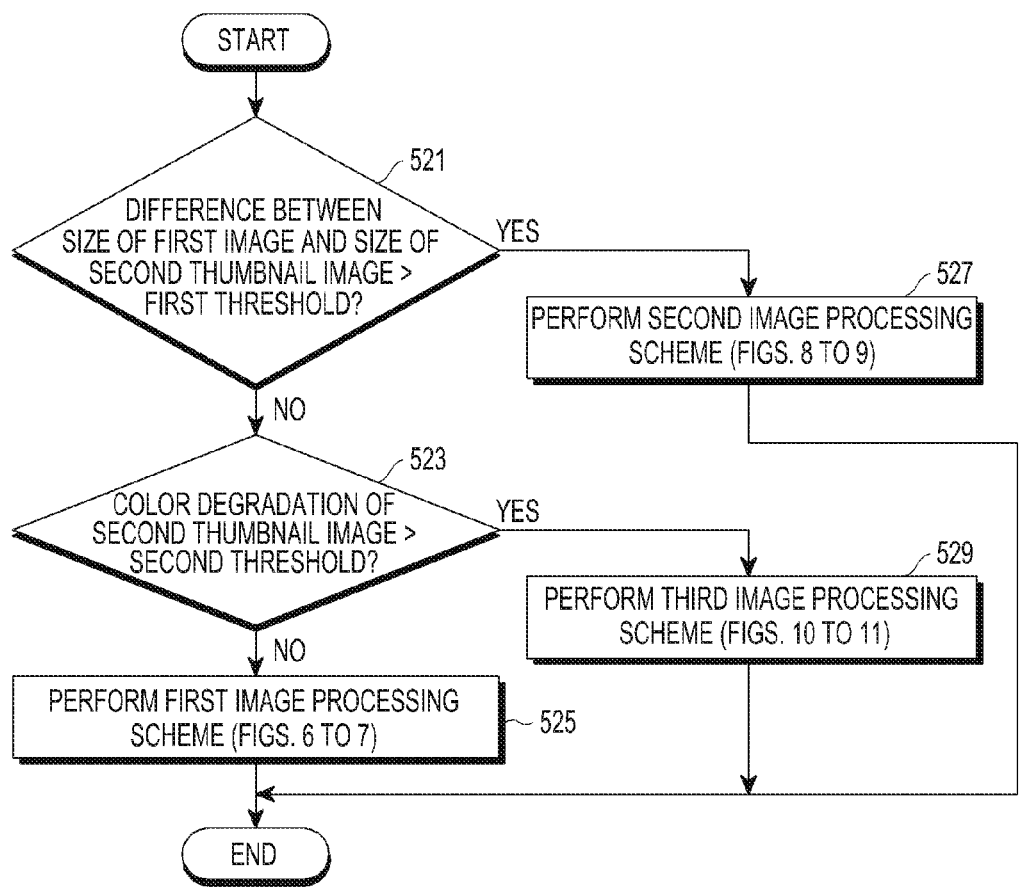
FIG. 5B is a flowchart illustrating an image processing scheme selection method of the electronic device according to various embodiments of the present disclosure.

FIG. 5B is a flowchart illustrating an image processing scheme selection method of the electronic device according to various embodiments of the present disclosure. In FIG. 5B, the image processing scheme selection method of the electronic device according to various embodiments of the present disclosure may be performed by the first processor 411 of the first electronic device 410 of FIG. 4 as an example.

Referring to FIG. 5B, when a first image to be uploaded to the second electronic device 420 is selected, the first processor 411 may compare a difference between a size of the first image and a size of a second thumbnail image related to the first image to be generated by the second electronic device 420 with a first threshold value in operation 521.

When the difference between the size of the first image and the size of the second thumbnail image is smaller than the first threshold value, the first processor 411 may compare color degradation of the second thumbnail image with a second threshold value in operation 523.

When the color degradation of the second thumbnail image is smaller than the second threshold value, the first processor 411 may generate a changed image related to the first image to be uploaded to the second electronic device 420 based on a first image processing scheme in operation 525. An operation of generating the changed image related to the first image based on the first image processing scheme will be described in detail with reference to FIGS. 6 to 7.

When the difference between the size of the first image and the size of the second thumbnail image is larger than the first threshold value, the first processor 411 may generate a changed image related to the first image to be uploaded to the second electronic device 420 based on a second image processing scheme in operation 527. An operation of generating the changed image related to the first image based on the second image processing scheme will be described in detail with reference to FIGS. 8 to 9.

When the color degradation of the second thumbnail image is larger than the second threshold value, the first processor 411 may generate a changed image related to the first image to be uploaded to the second electronic device 420 based on a third image processing scheme in operation 529. An operation of generating the changed image related to the first image based on the third image processing scheme will be described in detail with reference to FIGS. 10 to 11.

Figure 6:
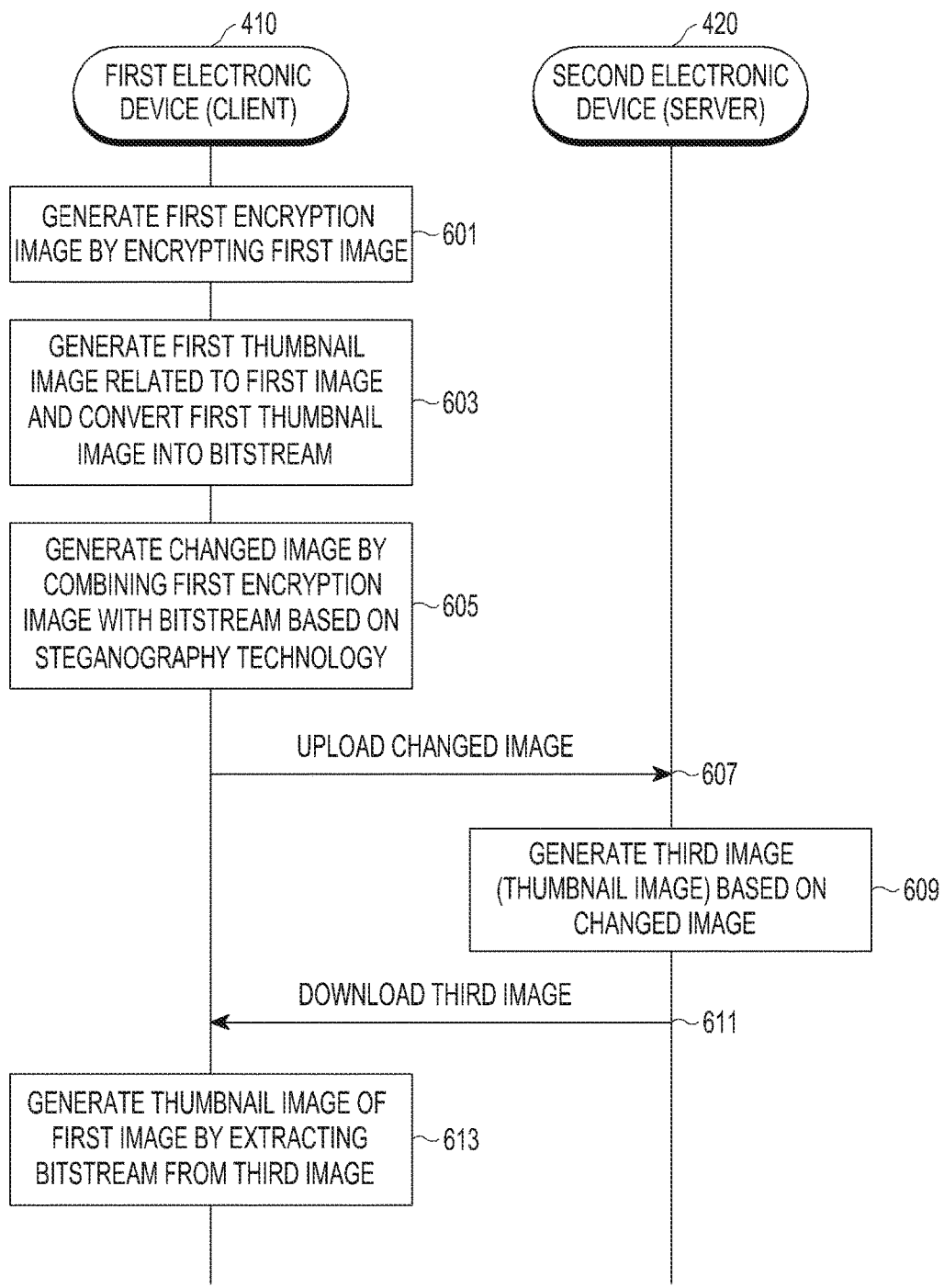
FIG. 6 is a flowchart illustrating a first image processing method of the electronic device according to various embodiments of the present disclosure.

FIG. 6 is a flowchart illustrating a first image processing method of the electronic device according to various embodiments of the present disclosure. In FIG. 6, the first image processing method of the electronic device according to various embodiments of the present disclosure may be performed by the first electronic device 410 and the second electronic device 420 of FIG. 4 as an example.

Referring to FIG. 6, in operation 601, the first electronic device 410 may generate a first encryption image by encrypting a first image selected to be uploaded to the second electronic device 420. In operation 603, the first electronic device 410 may generate a first thumbnail image related to the first image and convert the first thumbnail image into bitstream data. In operation 605, the first electronic device 410 may generate the changed image related to the first image by combining the first encryption image with the bitstream data corresponding to the first thumbnail image based on a steganography technique. When the first electronic device 410 uploads the changed image to the second electronic device 420 in operation 607, the second electronic device 420 may generate a third image (for example, thumbnail image) based on the uploaded changed image in operation 609.

When a request for receiving the first image is made by the first electronic device 410, the second electronic device 420 may download the third image to the first electronic device 410 in operation 611, and the first electronic device 410 may extract bitstream data from the downloaded third image, generate a thumbnail image of the first image by using the extracted bitstream data, and display the thumbnail image on the display 420 in operation 613.

Figure 7A:
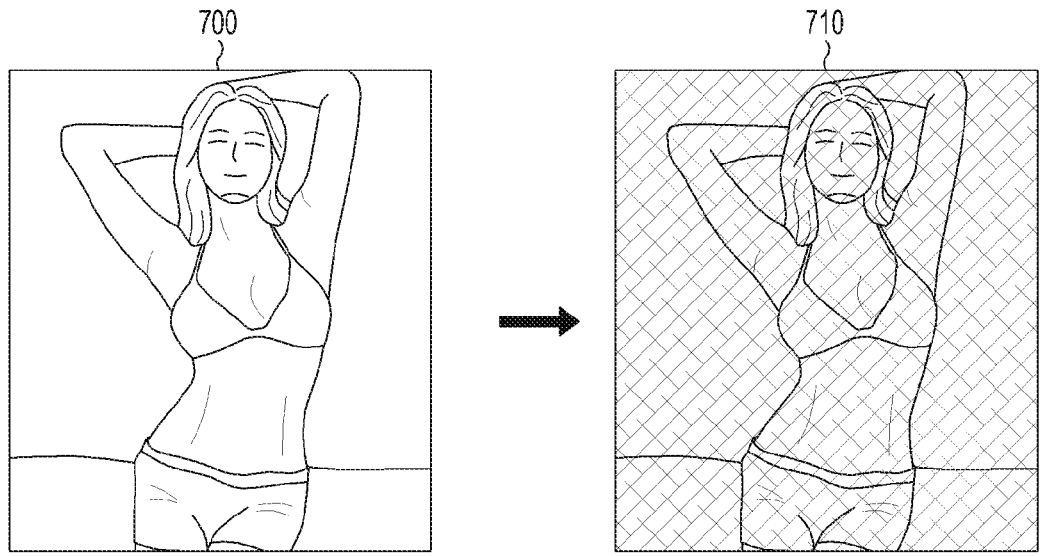
FIGS. 7A to 7C illustrate a first image processing operation of the electronic device according to various embodiments of the present disclosure.
Figure 7B:
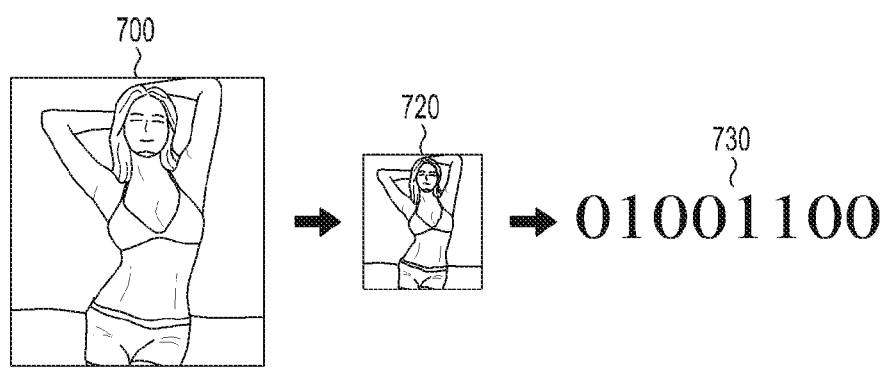
Figure 7C:
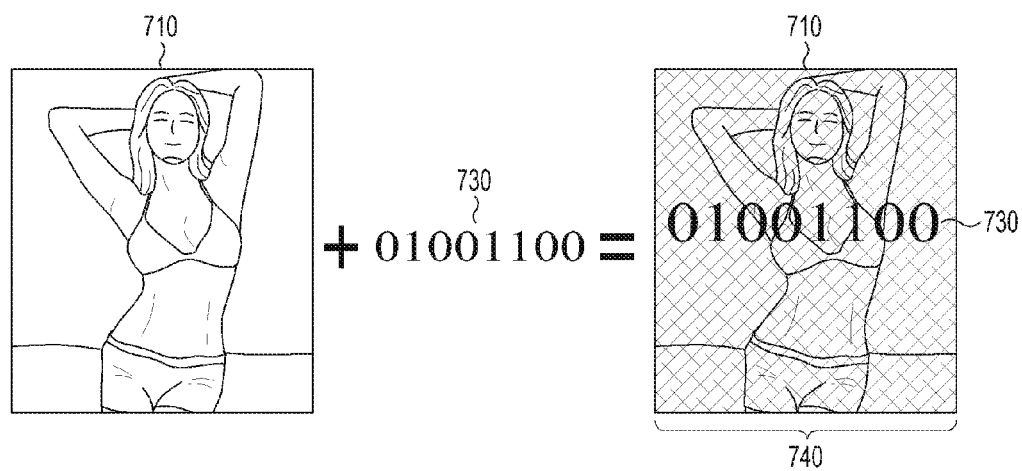

FIGS. 7A to 7C illustrate a first image processing operation of the electronic device according to various embodiments of the present disclosure.

The first electronic device 410 may generate a first encryption image 710 by encrypting a first image 700 as illustrated in FIG. 7A, and may generate a first thumbnail image 720 related to the first image 700 and convert the first thumbnail image 720 into bitstream data (for example, "01001100") 730 as illustrated in FIG. 7B. As illustrated in FIG. 7C, the first electronic device 410 may generate a changed image 740 related to the first image by combining the first encryption image 710 of FIG. 7A and the bitstream data (for example, "01001100") 730 corresponding to the first thumbnail image of FIG. 7B based on the steganography technique.

When the first electronic device 410 transmits the changed image 740 of FIG. 7C to the second electronic device 420, the second electronic device 420 may generate a third image (for example, thumbnail image) based on the changed image 740. The bitstream data (for example, "01001100") 730 may be inserted into the third image. Accordingly, when the second electronic device 420 downloads the third image, into which the bitstream data (for example, "01001100") 730 is inserted, to the first electronic device 410, the first electronic device 410 may extract the bitstream data (for example, "01001100") 730 inserted into the third image and generate a thumbnail image related to the first image.

Figure 8:
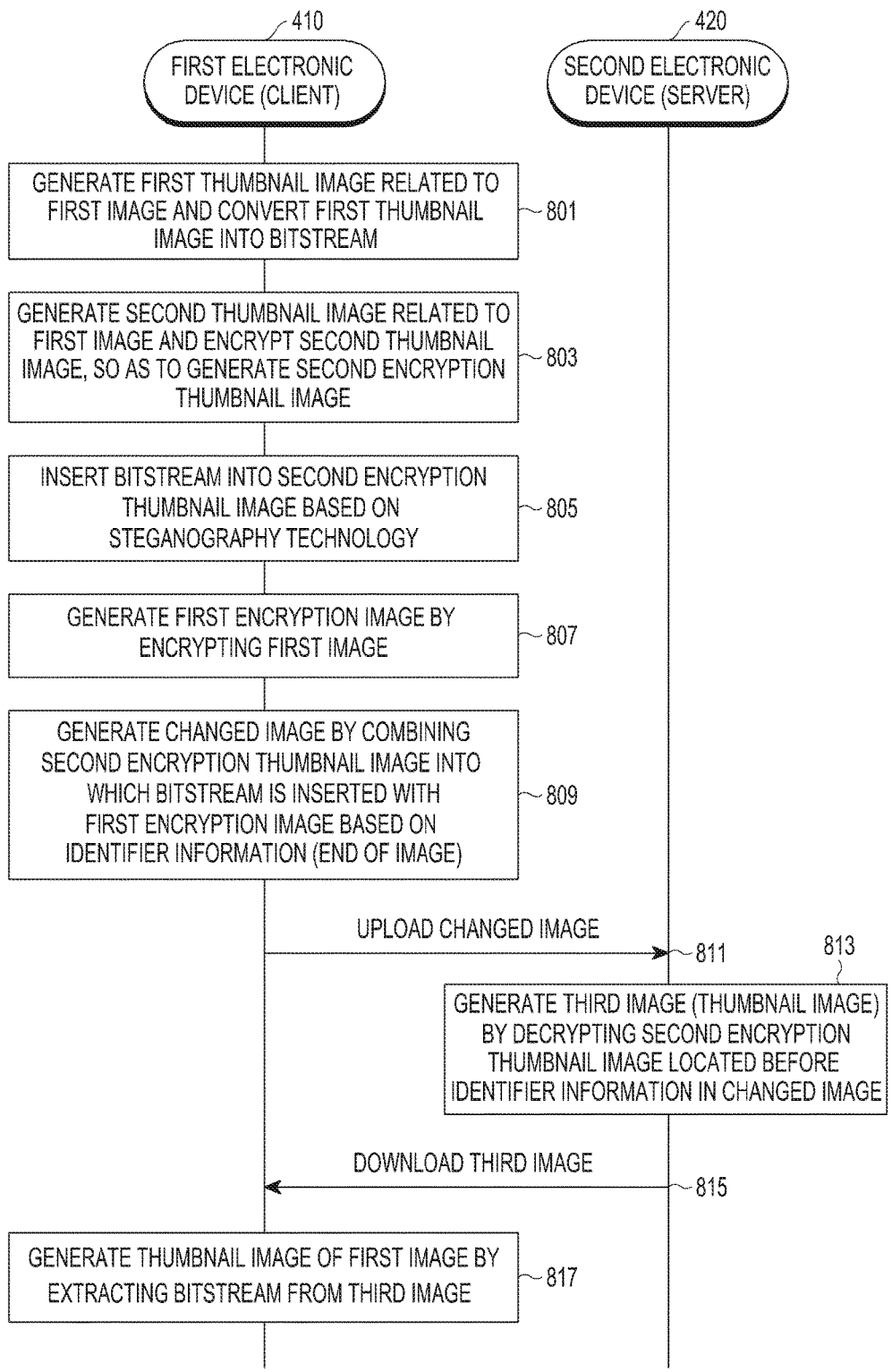
FIG. 8 is a flowchart illustrating a second image processing method of the electronic device according to various embodiments of the present disclosure.

FIG. 8 is a flowchart illustrating a second image processing method of the electronic device according to various embodiments of the present disclosure. In FIG. 8, the second image processing method of the electronic device according to various embodiments of the present disclosure may be performed by the first electronic device 410 and the second electronic device 420 of FIG. 4 as an example.

Referring to FIG. 8, in operation 801, the first electronic device 410 may generate a first thumbnail image related to a first image selected to be uploaded to the second electronic device 420 and convert the first thumbnail image into bitstream data. In operation 803, the first electronic device 410 may generate a second thumbnail image related to the first image and encrypt the second thumbnail image, so as to generate a second encryption thumbnail image. In operation 805, the first electronic device 410 may combine the second encryption image of operation 803 with the bitstream data corresponding to the first thumbnail image of operation 801 based on the steganography technique. In operation 807, the first electronic device 410 may generate a first encryption image by encrypting the first image. In operation 809, the first electronic device 410 may place the first encryption thumbnail image, into which the bitstream data of operation 805 is inserted, before identifier information (for example, "End of Image") based on the identifier information and place the first encryption image of operation 807 after the identifier information, so as to generate a changed image related to the first image. In operation 811, the first electronic device 410 may upload the changed image to the second electronic device 420.

In operation 813, when the changed image includes the identifier information, the second electronic device 420 may generate a third image (for example, thumbnail image) based on a second encryption thumbnail image, into which the bitstream data is inserted, located before the identifier.

When a request for receiving the first image is made by the first electronic device 410, the second electronic device 420 may download the third image to the first electronic device 410 in operation 815, and the first electronic device 410 may extract bitstream data from the downloaded third image, generate a thumbnail image of the first image by using the extracted bitstream data, and display the thumbnail image on the display 420 in operation 817.

FIGS. 9A to 9D illustrate a second image processing operation of the electronic device according to various embodiments of the present disclosure.

Figure 9A:
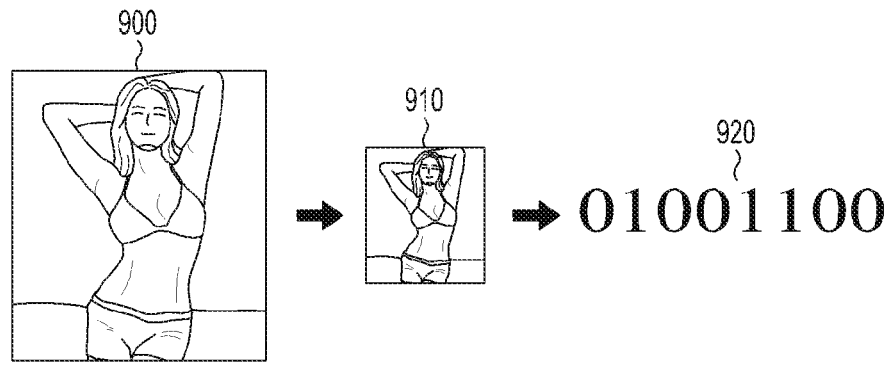
FIGS. 9A to 9D illustrate a second image processing operation of the electronic device according to various embodiments of the present disclosure.
Figure 9B:
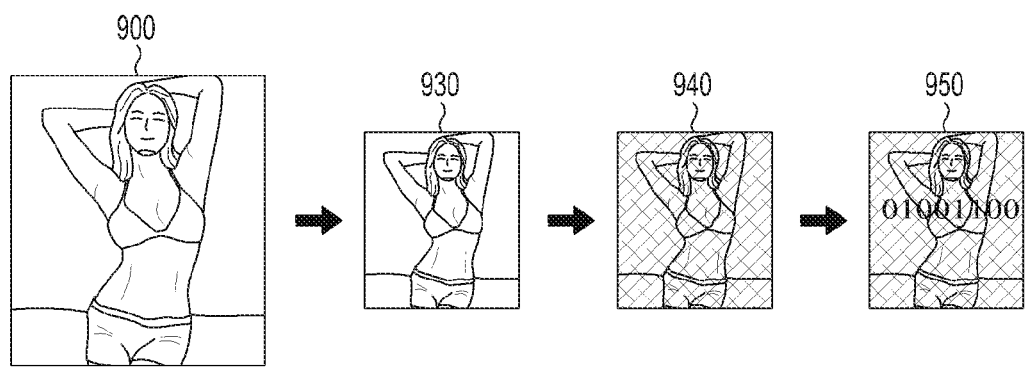
Figure 9C:
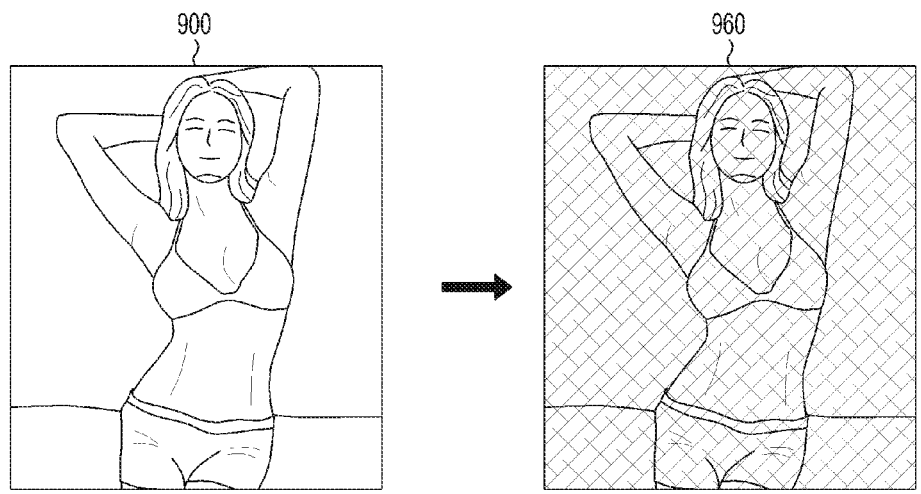
Figure 9D:
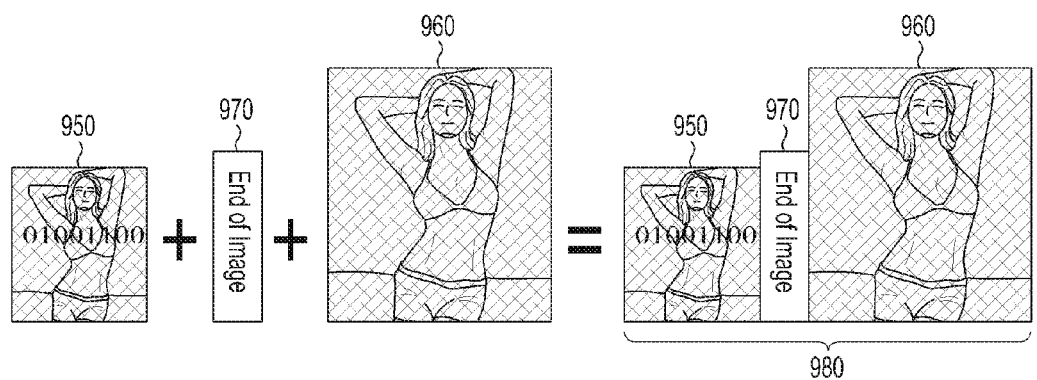

As illustrated in FIG. 9A, the first electronic device 410 may generate a first thumbnail image 910 related to a first image 900 and convert the first thumbnail image 910 into bitstream (for example, "01001100") 920. As illustrated in FIG. 9B, the first electronic device 410 may generate a second thumbnail image 930 related to the first image 900 and encrypt the second thumbnail image, so as to generate a second encryption thumbnail image 940. The first electronic device 410 may generate an image 950 generated by combining the second encryption thumbnail image and bitstream data corresponding to the first thumbnail image 910 of FIG. 9A based on the steganography technique. As illustrated in FIG. 9C, the first electronic device 410 may generate the first encryption image 960 by encrypting the first image 900. As illustrated in FIG. 9D, the first electronic device 410 may place the second encryption thumbnail image, into which the bitstream data of FIG. 9B is inserted, before identifier information (for example, "End of Image") 970 based on the identifier information 970, place the first encryption image 960 of FIG. 9C after the identifier information 970, and combine them to generate a changed image 980 related to the first image 900.

When the first electronic device 410 transmits the changed image 980 of FIG. 9D to the second electronic device 420, the second electronic device 420 may detect the second encryption thumbnail image, into which the bitstream data is inserted, located before the identifier information in the changed image 980, and generate a third image (for example, thumbnail image) based on the detected second encryption thumbnail image into which the detected bitstream data is inserted.

The bitstream data (for example, "01001100") 920 is inserted into the third image. Accordingly, when the second electronic device 420 downloads the third image, into which the bitstream data (for example, "01001100") 920 is inserted, to the first electronic device 410, the first electronic device 410 may extract the bitstream data (for example, "01001100") 920 inserted into the third image and generate a thumbnail image of the first image.

Figure 10:
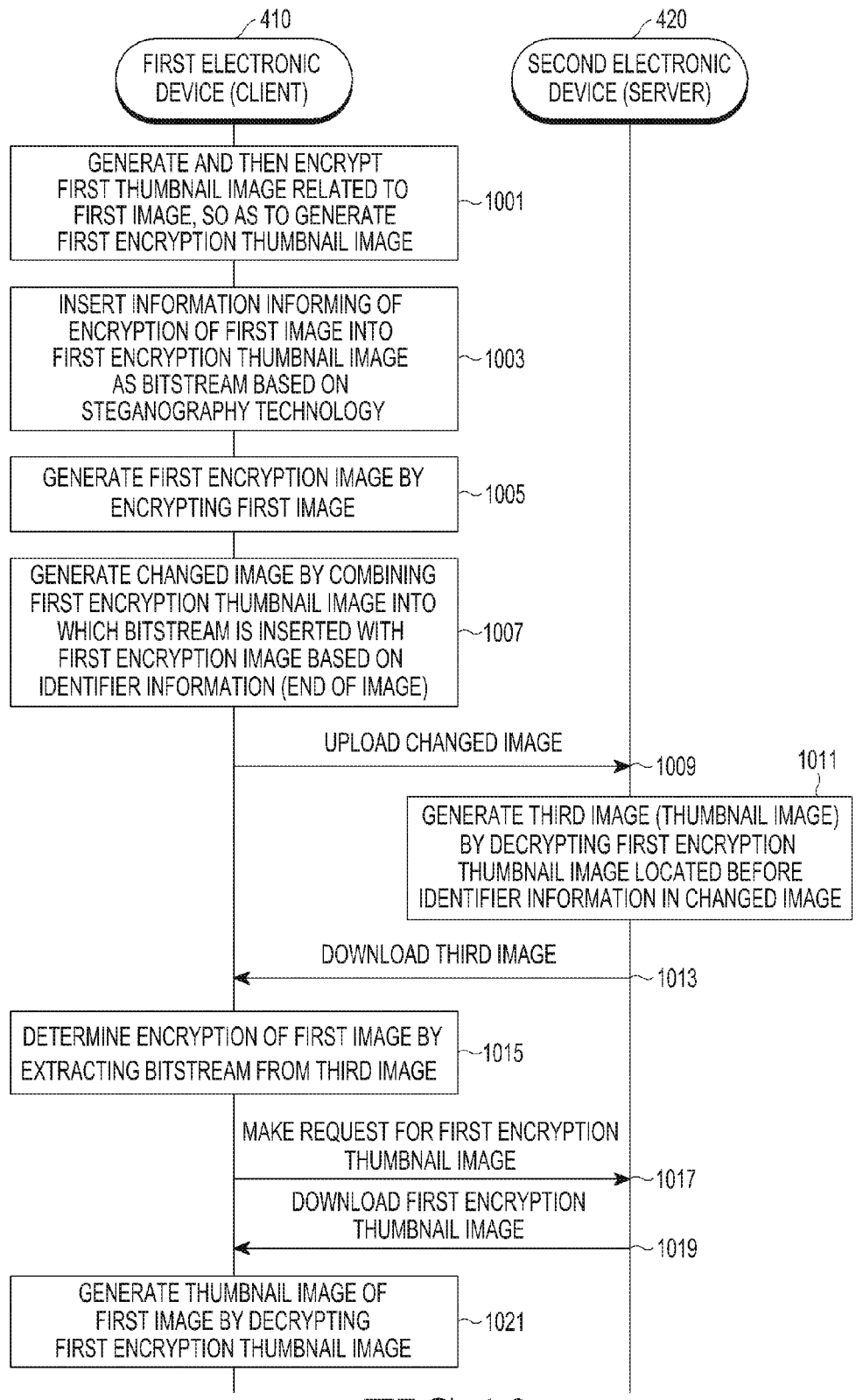
FIG. 10 is a flowchart illustrating a third image processing method of the electronic device according to various embodiments of the present disclosure.

FIG. 10 is a flowchart illustrating a third image processing method of the electronic device according to various embodiments of the present disclosure. In FIG. 10, the third image processing method of the electronic device according to various embodiments of the present disclosure may be performed by the first electronic device 410 and the second electronic device 420 of FIG. 4 as an example.

Referring to FIG. 10, in operation 1001, the first electronic device 410 may generate a first thumbnail image related to a first image selected to be uploaded to the second electronic device 420 and encrypt the first thumbnail image, so as to generate a first encryption thumbnail image. In operation 1003, the first electronic device 410 may insert bitstream data corresponding to information informing of the encryption of the first image into the first encryption thumbnail image based on the steganography technique. In operation 1005, the first electronic device 401 may generate the first encryption image by encrypting the first image. In operation 1007, the first electronic device 401 may place the first encryption thumbnail image, into which the bitstream data of operation 1003 is inserted, before identifier information (for example, "End of Image") based on the identifier information and place the first encryption image of operation 1005 after the identifier information, so as to generate a changed image related to the first image. In operation 1008, the first electronic device 410 may upload the changed image to the second electronic device 420.

In operation 1009, when the changed image includes the identifier information, the second electronic device 420 may generate a third image (for example, thumbnail image) based on the first encryption thumbnail image, into which the bitstream data is inserted, located before the identifier.

When a request for receiving the first image is made by the first electronic device 410, the second electronic device 420 may download the third image to the first electronic device 410 in operation 1013, and the first electronic device 410 may extract bitstream data from the downloaded third image and acquire information indicating that the first image has been encrypted based on the extracted bitstream data in operation 1015. In operation 1017, the first electronic device 410 may make a request for, to the second electronic device 420, the first encryption thumbnail image, into which the bitstream data is inserted, located before the identifier information among the changed image. When the first encryption thumbnail image, into which the bitstream data is inserted, is received from the second electronic device 420 in operation 1019, the first electronic device 410 may generate a thumbnail image of the first image by encrypting the encrypted first thumbnail image based on a pre-stored key in operation 1021 and display the generated thumbnail image on the display 420.

FIGS. 11A to 11D illustrate a third image processing operation of the electronic device according to various embodiments of the present disclosure.

Figure 11A:
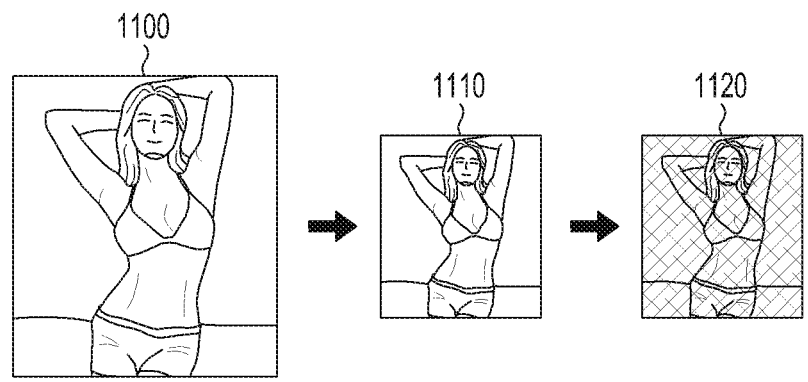
FIGS. 11A to 11D illustrate a third image processing operation of the electronic device according to various embodiments of the present disclosure.
Figure 11B:
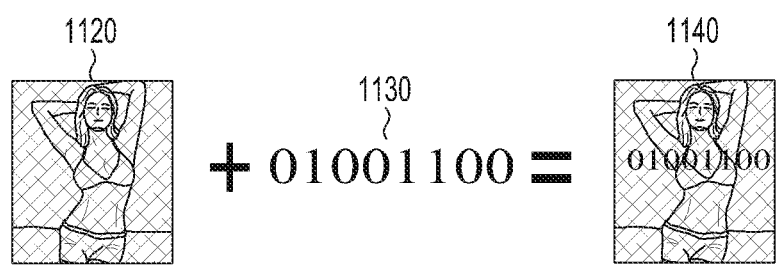
Figure 11C:
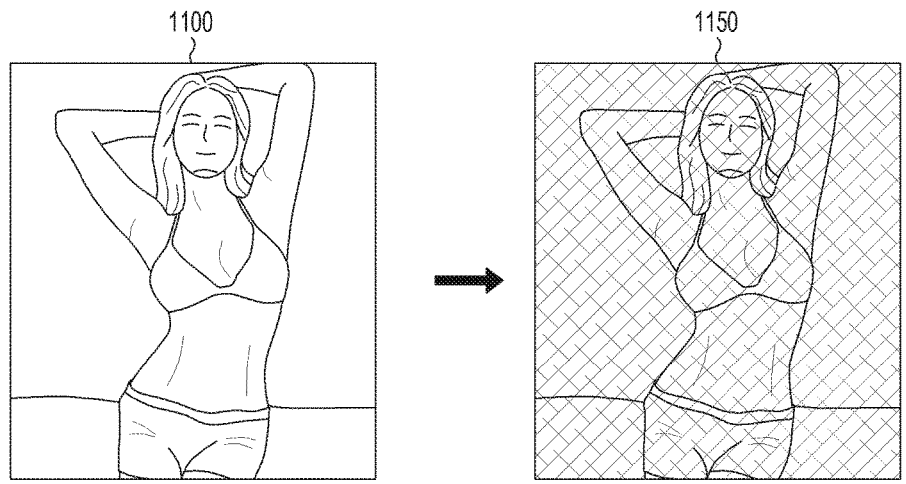
Figure 11D:
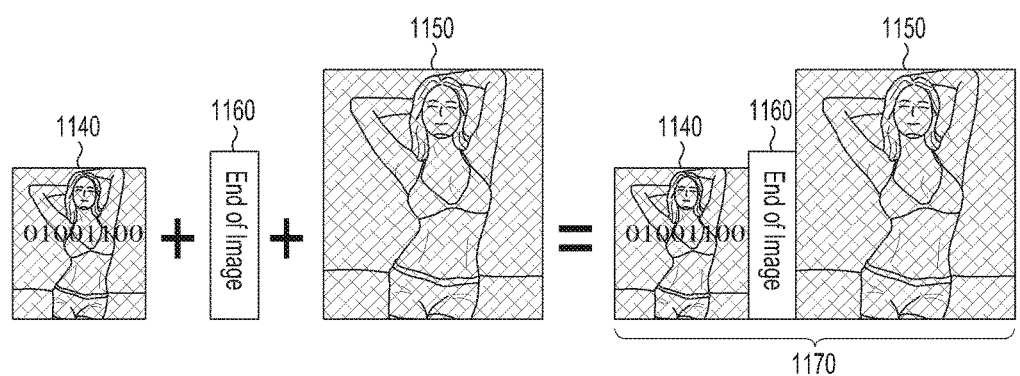

As illustrated in FIG. 11A, the first electronic device 410 may generate a first thumbnail image 1110 related to a first image 1100 and encrypt the first thumbnail image 1110, so as to generate a first encryption thumbnail image 1120. As illustrated in FIG. 11B, the first electronic device 410 may generate an image 1140 generated by combining the first encryption thumbnail image 1120 of FIG. 11A and bitstream data 1130 corresponding to minimum or reduced information informing of the encryption of the first image 1100 based on the steganography technique. As illustrated in FIG. 11C, the first electronic device 410 may generate a first encryption image 1150 by encrypting the first image 1100. As illustrated in FIG. 11D, the first electronic device 410 may place the first encryption thumbnail image 1140, into which the bitstream data of FIG. 11B is inserted, before identifier information (for example, "End of Image") 1160 based on the identifier information 1160, place the first encryption image 1150 of FIG. 11C after the identifier information 1160, and combine them to generate a changed image 1170 related to the first image 1100.

When the first electronic device 410 transmits the changed image 1170 of FIG. 11D to the second electronic device 420, the second electronic device 420 may detect the first encryption thumbnail image 1140, into which the bitstream data is inserted, located before the identifier information in the changed image 1170, and generate a third image (for example, thumbnail image) based on the detected first encryption thumbnail image 1140 into which the detected bitstream data is inserted. The bitstream data (for example, "01001100") 1130 is inserted into the third image. Accordingly, when the second electronic device 420 downloads the third image, into which the bitstream data (for example, "01001100") 1130 is inserted, to the first electronic device 410, the first electronic device 410 may extract the bitstream data (for example, "01001100") 1130 inserted into the third image and acquire information informing of the encryption of the first image. The first electronic device 410 may make a request for the second encryption thumbnail image 1140, into which the bitstream data is inserted, in the changed image 1170 to the second electronic device 420. When the first electronic device 410 receives the second encryption thumbnail image 1140, into which the bitstream data is inserted, from the second electronic device 420, the first electronic device 410 may generate a thumbnail image of the first image by decrypting the second encryption thumbnail image 1140 based on a pre-stored key.

According to various embodiments of the present disclosure, a method of managing an image by an electronic device may include an operation of generating a first encryption image by encrypting a first image, an operation of acquiring bitstream data corresponding to a second image related to the first image, an operation of generating a changed image by combining at least some of the bitstream data and the first encryption image, and an operation of transmitting the changed image to an external electronic device.

According to various embodiments of the present disclosure, the method may further include an operation of identifying transmission information of the first image in response to a request for transmitting the first image to the external electronic device and an operation of determining generation of the changed image related to the first image based on the transmission information of the first image, wherein the transmission information may include at least one of a network connection state, photographing information of the first image, and application information related to the first image.

According to various embodiments of the present disclosure, the second image may include a thumbnail image of the first image.

According to various embodiments of the present disclosure, the thumbnail image may include at least one of a first thumbnail image of the first image generated by the electronic device and a second thumbnail image of the first image to be generated by the external electronic device.

According to various embodiments of the present disclosure, the operation of generating the changed image may include an operation of generating the changed image by combining at least some of bitstream data corresponding to a first thumbnail image related to the first image and the first encryption image.

According to various embodiments of the present disclosure, the operation of generating the changed image may include an operation of combining at least some of bitstream data corresponding to a first thumbnail image related to the first image and a second encryption thumbnail image encrypted from a second thumbnail image related to the first image and an operation of generating the changed image by combining the second encryption thumbnail image and the first encryption image based on identifier information.

According to various embodiments of the present disclosure, the operation of generating the changed image may include an operation of combining at least some of bitstream data corresponding to information informing of the encryption of the first image and a first encryption thumbnail image encrypted from a first thumbnail image related to the first image and an operation of generating the changed image by combining the first encryption thumbnail image and the first encryption image based on identifier information.

According to various embodiments of the present disclosure, if a third image related to the first image is received from the external electronic device in response to the request for the first image, the method may include an operation of generating the second image related to the first image based on bitstream data acquired from the third image, wherein the third image includes a thumbnail image generated by the external electronic device based on a changed image corresponding to the first image transmitted by the electronic device.

According to various embodiments of the present disclosure, the operation of generating the second image may include, if the acquired bitstream data corresponds to the second image related to the first image, an operation of generating the second image by using the bitstream data.

According to various embodiments of the present disclosure, the operation of generating the second image may include, if the acquired bitstream data corresponds to information informing of the encryption of the first image, an operation of making a request for a first encryption thumbnail image related to the first image to the external electronic device and an operation of generating the second image based on the first encryption thumbnail image received from the external electronic device.

According to various embodiments of the present disclosure, a storage medium that includes instructions stored therein is provided. The instructions are configured to allow one or more processors to perform one or more operations when being executed by the one or more processors. The one or more operations may record a program for executing operation of generating a first encryption image by encrypting a first image, an operation of acquiring bitstream data corresponding to a second image related to the first image, an operation of generating a changed image by combining at least some of the bitstream data and the first encryption image, and an operation of transmitting the changed image to an external electronic device.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method of managing an image by an electronic device, the method comprising:
   generating a first encryption image by encrypting a first image;
   acquiring bitstream data corresponding to a second image related to the first image;
   generating a changed image by combining at least some of the bitstream data and the first encryption image;
   transmitting the changed image to an external electronic device;
   generating the second image related to the first image based on bitstream data acquired from a third image, if the third image related to the first image is received from the external electronic device in response to a request for the first image,
   wherein the third image includes a thumbnail image generated by the external electronic device based on the changed image corresponding to the first image transmitted by the electronic device;
   identifying transmission information of the first image in response to a request for transmitting the first image to the external electronic device; and
   determining generation of the changed image related to the first image based on the transmission information of the first image, wherein the transmission information includes at least one of a network connection state, photographing information of the first image, and application information related to the first image.

2. The method of claim 1, wherein the second image includes a thumbnail image of the first image.

3. The method of claim 2, wherein the thumbnail image includes at least one of a first thumbnail image of the first image generated by the electronic device and a second thumbnail image of the first image to be generated by the external electronic device.

4. The method of claim 1, wherein the generating of the changed image comprises generating the changed image by combining at least some of bitstream data corresponding to a first thumbnail image related to the first image and the first encryption image.

5. The method of claim 1, wherein the generating of the changed image comprises:
combining at least some of bitstream data corresponding to a first thumbnail image related to the first image and a second encryption thumbnail image encrypted from a second thumbnail image related to the first image; and
generating the changed image by combining the second encryption thumbnail image and the first encryption image based on identifier information.

6. The method of claim 1, wherein the generating of the changed image comprises:
combining at least some of bitstream data corresponding to information related to the encryption of the first image and a first encryption thumbnail image encrypted from a first thumbnail image related to the first image; and
generating the changed image by combining the first encryption thumbnail image and the first encryption image based on identifier information.

7. The method of claim 1, wherein the generating of the second image comprises, if the acquired bitstream data corresponds to the second image related to the first image, generating the second image by using the bitstream data.

8. The method of claim 1, wherein the generating of the second image comprises:
if the acquired bitstream data corresponds to information informing of the encryption of the first image, making a request for a first encryption thumbnail image related to the first image to the external electronic device; and
generating the second image based on the first encryption thumbnail image received from the external electronic device.

9. An electronic device comprising:
a display; and
a processor configured to:
generate a first encryption image by encrypting a first image,
acquire bitstream data corresponding to a second image related to the first image,
generate a changed image by combining at least some of the bitstream data with the first encryption image,
transmit the changed image to an external electronic device,
generate the second image related to the first image based on bitstream data aquired from a third image, if the third image related to the first image is received from the external electronic device in response to a request for the first image,
wherein the third image includes a thumbnail image generated by the external electronic device based on the changed image corresponding to the first image transmitted from the electronic device,
identify transmission information of the first image in response to a request to transmit the first image to the external electronic device, and
determine generation of the changed image related to the first image based on the transmission information of the first image, and
wherein the transmission information includes at least one of a network connection state, photographing information of the first image, and application information related to the first image.

10. The electronic device of claim 9, wherein the second image includes a thumbnail image for the first image.

11. The electronic device of claim 10, wherein the thumbnail image includes at least one of a first thumbnail image for the first image generated by the electronic device and a second thumbnail image for the first image to be generated by the external electronic device.

12. The electronic device of claim 9, wherein the processor is configured to generate the changed image by combining at least some of bitstream data corresponding to a first thumbnail image related to the first image with the first encryption image.

13. The electronic device of claim 9, wherein the processor is configured to combine at least some of bitstream data corresponding to a first thumbnail image related to the first image with a second encryption thumbnail image encrypted from a second thumbnail image related to the first image and to combine the second encryption thumbnail image with the first encryption image based on identifier information, so as to generate the changed image.

14. The electronic device of claim 9, wherein the processor is configured to combine at least some of bitstream data corresponding to information related to encryption of the first image with a first thumbnail image related to the first image with a first encryption thumbnail image; and to combine the first encryption thumbnail image with the first encryption image based on identifier information, so as to generate the changed image.

15. The electronic device of claim 9, wherein, if the acquired bitstream data corresponds to the second image related to the first image, the processor is configured to generate the second image based on the bitstream data.

16. The electronic device of claim 9, wherein, if the acquired bitstream data corresponds to information informing of the encryption of the first image, the processor is configured to make a request for a first encryption thumbnail image related to the first image to the external electronic device, and to generate the second image based on the first encryption thumbnail image received from the external electronic device.

* * * * *